(12) United States Patent
Linstid, III et al.

(10) Patent No.: US 6,207,790 B1
(45) Date of Patent: Mar. 27, 2001

(54) PROCESS FOR PRODUCING AMORPHOUS ANISOTROPIC MELT-FORMING POLYMERS HAVING A HIGH DEGREE OF STRETCHABILITY AND POLYMERS PRODUCED BY SAME

(75) Inventors: H. Clay Linstid, III, Clinton, NJ (US); Derrick B. McKie, Brooklyn, NY (US)

(73) Assignee: Ticona LLC, Summit, NJ (US)

( * ) Notice: Subject to any disclaimer, the term of this patent is extended or adjusted under 35 U.S.C. 154(b) by 0 days.

(21) Appl. No.: 09/483,765

(22) Filed: Jan. 14, 2000

(51) Int. Cl.$^7$ .............................. C08G 63/00; B32B 19/00
(52) U.S. Cl. .................. 528/190; 528/193; 528/194; 528/206; 528/210; 528/211; 528/212; 528/219; 528/272; 528/288; 528/298; 528/302; 528/308; 528/308.6; 428/357
(58) Field of Search ............................ 528/190, 193, 528/194, 206, 210, 211, 212, 219, 272, 288, 298, 302, 308, 308.6; 428/357

(56) References Cited

U.S. PATENT DOCUMENTS

| | | | |
|---|---|---|---|
| 4,351,918 | 9/1982 | Charbonneau et al. | 524/602 |
| 4,473,682 | 9/1984 | Calundann et al. | 524/605 |
| 4,522,974 | 6/1985 | Calundann et al. | 524/605 |
| 4,563,308 | 1/1986 | Cottis et al. | 525/444 |
| 4,722,993 | 2/1988 | Hisgen et al. | 528/183 |
| 4,918,154 | 4/1990 | Hayashi et al. | 528/190 |
| 4,920,197 | 4/1990 | Hayashi et al. | 528/190 |
| 4,937,310 | 6/1990 | Hayashi et al. | 528/193 |
| 4,966,956 | 10/1990 | Andreu et al. | 528/185 |
| 4,983,713 | 1/1991 | Hayashi et al. | 528/190 |
| 5,025,082 | 6/1991 | Kishiro et al. | 528/190 |
| 5,037,939 | 8/1991 | Eckhardt et al. | 528/193 |
| 5,055,546 | 10/1991 | Sugimoto et al. | 528/193 |
| 5,066,767 | 11/1991 | Matzner et al. | 528/193 |
| 5,089,594 | 2/1992 | Stern et al. | 528/194 |
| 5,171,823 | 12/1992 | Charbonneau et al. | 528/193 |
| 5,204,443 | 4/1993 | Lee et al. | 528/184 |
| 5,399,656 | 3/1995 | Nitta et al. | 528/193 |
| 5,508,374 | 4/1996 | Lee et al. | 528/184 |
| 5,525,700 | 6/1996 | Sanuels et al. | 528/190 |
| 5,656,714 | 8/1997 | Shen et al. | 528/193 |
| 5,663,276 | 9/1997 | Yoneta et al. | 528/194 |
| 5,798,432 | 8/1998 | Lee et al. | 528/176 |

FOREIGN PATENT DOCUMENTS

| | | |
|---|---|---|
| 0909781A2 | 4/1999 | (EP). |
| 0911150A2 | 4/1999 | (EP). |
| 0928683A2 | 7/1999 | (EP). |

OTHER PUBLICATIONS

Anisotropic Polymers, Their Synthesis and Properties, G. W. Calundann and M.Jaffe, pp 247–291 Proceedings of the Robert A. Welch Conferences on Chemical Research XXVI, Synthetic Polymers, 1982.

R.S. Irwin, "Chain Folding in Thermotropic Polyesters", Macromolecules 1993, vol. 26, pp. 7125–7133.

W. J. Jackson, Jr., "Liquid Crystalline Aromatic Polyesters: An Overview", Journal of Applied Polymer Science: Applied Polymer Symposium, vol. 41, pp. 25–33 (1985).

D. S. Nagvekar et al, "New Wholly–Aromatic Thermotropic Polyesters with Controlled Flexibility", Materials Research Symposium Paper, Spring 1999.

Primary Examiner—Samuel A. Acquah
(74) Attorney, Agent, or Firm—Karen E. Klumas

(57) ABSTRACT

Process for producing highly stretchable, amorphous anisotropic melt-forming polymers consisting essentially of recurring units derived from p-hydroxybenzoic acid, 6-hydroxy-2-naphthoic acid, an aromatic diacid, at least a portion of which comprises 2,6-naphthalene dicarboxylic acid, and an aromatic diol and/or hydroxyamine component, at least a portion of which is 4,4'-biphenol; which comprises incorporating into such polymers recurring units derived from resorcinol, wherein each of said recurring units is present in the polymer in specified amounts.

27 Claims, No Drawings

PROCESS FOR PRODUCING AMORPHOUS ANISOTROPIC MELT-FORMING POLYMERS HAVING A HIGH DEGREE OF STRETCHABILITY AND POLYMERS PRODUCED BY SAME

RELATED APPLICATIONS

The following copending applications, filed on even date herewith, all contain related subject matter: U.S. application Ser. Nos.: 09/483,103, 09/484,120 and 09/483,589. This amendment identifies the related co-pending applications by Serial number.

BACKGROUND OF THE INVENTION

1. Field of the Invention

The present invention relates to a process for producing highly stretchable amorphous anisotropic melt-forming polymers suitable for use in the production of a variety of shaped articles including films, fibers, and blow molded forms. This invention also relates to the polymers produced from the subject process, as well as to shaped articles made from such polymers.

2. Description of the Prior Art

Anisotropic melt-forming polymers, also known as liquid crystalline polymers or "LCPs", are well known in the art. Anisotropic melt-forming polymers exhibit a parallel ordering of molecular chains in the melt phase and are also termed "thermotropic" liquid crystal polymers. Many of these materials are wholly aromatic in nature.

Thermotropic polymers include aromatic copolyesters having recurring units derived from p-hydroxybenzoic acid, at least one aromatic diol and at least one aromatic dicarboxylic acid as well as wholly aromatic copolyesteramides having recurring units derived from p-hydroxybenzoic acid, at least one aromatic diol, at least one aromatic diacid, and aminophenol. Without the inclusion of recurring units that disrupt the crystalline structure, such polymers tend to have very high melting points, for example, 360° C. and above, making them difficult to melt fabricate. Incorporation of recurring units that provide non-parallel or "kinky" linkages is a common means of lowering melting point. These kinky linkages include "meta"or 1,3-aromatic ring structures.

Common materials from which meta linkages are derived include m-hydroxybenzoic acid, isophthalic acid, resorcinol, and m-aminophenol. U.S. Pat. Nos. 4,563,508; 5,037,939; and 5,066,767 disclose polymers containing recurring units derived from p-hydroxybenzoic acid, terephthalic acid, isophthalic acid, hydroquinone and 4,4'-biphenol; U.S. Pat. No. 4,912,193 discloses polymers having recurring units derived from p-hydroxybenzoic acid, 4,4'-biphenol, terephthalic acid and isophthalic acid; U.S. Pat. No. 4,966,956 discloses polymers having recurring units derived from p-hydroxybenzoic acid, terepthalic acid, isophthalic acid, 4,4'-biphenol and aminophenol; U.S. Pat. No. 5,663,276 discloses polymers having recurring units derived from p-hydroxybenzoic acid, terephthalic acid, 4,4'-biphenol, isophthalic acid, hydroquinone and 4,4'-biphenyldicarboxylic acid; U.S. Pat. No. 5,089,594 discloses polymers having recurring units derived from p-hydroxybenzoic acid, terephthalic acid, isophthalic acid, 4,4'-biphenol, and an aromatic diol, for example, hydroquinone; U.S. Pat. No. 4,722,993 discloses polymers having recurring units derived from m-aminophenol, p-hydroxybenzoic acid, terephthalic and/or isophthalic acid, one or more of hydroquinone, 4,4'-biphenol or resorcinol and, if desired, m-hydroxybenzoic acid; U.S. Pat. No. 5,399,656 discloses polymers having recurring units derived from p-hydroxybenzoic acid, terephthalic acid, resorcinol and an aromatic diol, for example, 4,4'-biphenol; U.S. Pat. No. 5,025,082, discloses polymers having recurring units derived from p-hydroxybenzoic acid, terephthalic acid, 4,4'-biphenol, 2,6-naphthalene dicarboxylic acid, and at least one aromatic diol selected from hydroquinone, methylhydroquinone, trirnethylhydroquinone, resorcinol and tetramethylbiphenol; and U.S. Pat. No. 5,798,432 discloses polymers having requiring units derived from p-hydroxy benzoic acid, 2,6-naphthalene dicarboxylic acid, terephthalic acid, isophthalic acid, hydroquinone, p-aminophenol and 4,4'-biphenol.

The presence of meta linkages notwithstanding, aromatic polymers derived from p-hydroxybenzoic acid, at least one aromatic dicarboxylic acid and at least one aromatic diol and/or aminophenol tend to have highly ordered crystalline structures and, although drawable in the melt, generally lack the ability to be stretched to a significant degree at temperatures below the molten state.

Another class of thermotropic polymers have recurring units derived from p-hydroxybenzoic acid, 6-hydroxy-2-naphthoic acid, at least one aromatic diacid and at least one aromatic diol. The incorporation of meta linkages into such polymers is described, for example, in the following: U.S. Pat. No. 4,522,974 disclosing polymers having recurring units derived from p-hydroxy benzoic acid, 6-hydroxy-2-naphthoic acid, hydroquinone and isophthalic and/or terephthalic acid; U.S. Pat. No. 4,920,197 disclosing polymers having recurring units derived from p-hydroxybenzoic acid, 6-hydroxy-2-naphthoic acid, terephthalic acid, isophthalic acid and resorcinol; U.S. Pat. No. 4,937,310 disclosing polymers having recurring units derived from p-hydroxybenzoic acid, 6-hydroxy-2-naphthoic acid, terephthalic acid, isophthalic acid and resorcinol; U.S. Pat. No. 4,918,154 disclosing polymers having recurring units derived from p-hydroxybenzoic acid, 6-hydroxy-2-naphthoic acid, terephthalic and/or isophthalic acid, resorcinol and hydroquinone; and U.S. Pat. No. 4,983,713 disclosing polymers having recurring units derived from p-hydroxybenzoic acid, 6-hydroxy-2-naphthoic acid, terephthalic acid, 4,4'-biphenol, and isophthalic acid. The polymers set forth in the examples of these patents tend to have ordered crystalline structures and are not considered to be highly stretchable materials.

More recent patents disclose liquid crystalline polymers that include amorphous materials. Example 5 of U.S. Pat. No. 5,525,700 is directed to what appears to be an amorphous polymer having recurring units derived from p-hydroxybenzoic acid, 6-hydroxy-2-naphthoic acid, hydroquinone, terephthalic acid, 4,4'-biphenol and 2,6-naphthalene dicarboxylic acid. Crystalline polymers derived from the same recurring units are also disclosed. In fact, of the numerous polymers exemplified by this patent, all but Example 5 are crystalline materials. Example 5 is not believed to be a highly stretchable polymer.

U.S. Pat. No. 5,656,714 discloses amorphous and what are termed "semi-crystalline" polymers having recurring units derived from p-hydroxybenzoic acid, 6-hydroxy-2-naphthoic acid, terephthalic acid, 4,4'-biphenol, and resorcinol. Fibers made from the amorphous polymers of Examples I and IX were respectively reported to be drawn to 73 and 30 times their as-spun length. Apart from Examples I and IX, no additional data regarding the stretchability of the exemplified polymers is provided. The polymers exemplified by U.S. Pat. No. 5,656,714 vary in terms of their degree of crystallinity; some, but not all, of these polymers are highly stretchable.

LCPs that are stretchable at lower temperatures have a diverse range of end-use applications. Amorphous LCPs having a Tg (i.e., onset of the glass transition temperature as measured by differential scanning calorimetry or "DSC") of 150° C. or less that are highly stretchable at temperatures above Tg, but below the temperature at which the LCP is in the molten state, are of particular interest in the production of articles that are stretched, drawn or otherwise processed at lower temperatures. Liquid crystalline polymers that are stretchable at temperatures below the processing temperatures of conventional film-forming polymers such as, for example, polyolefins or polyalkylene terephthalates, for example, PBT or PET, may be particularly desirable for use in the production of multilayer articles such as films, laminates, blow-molded containers, and the like. In these multi-layer applications, the barrier, mechanical and/or optical properties of liquid crystalline polymers may provide advantages that are typically not obtained from conventional thermoplastics. EP 0 928 683 A2, published Jul. 14, 1999, discloses a variety of multi-layer laminates, including laminates formed from wholly aromatic, liquid crystalline polymers of the type disclosed in U.S. Pat. No. 5,656,714.

A process for producing highly stretchable amorphous LCPs and the LCPs so produced are desired.

SUMMARY OF THE INVENTION

It now been found that in order to produce highly stretchable amorphous anisotropic polymers, it is necessary to provide the polymer with specific recurring units in narrowly defined amounts. In one embodiment, the present invention is directed to a process for forming highly stretchable, amorphous anisotropic melt-forming polymers which comprises incorporating recurring unit V of the formula:

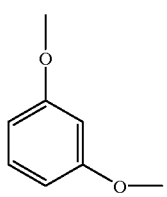

V into a polymer comprising recurring units I, II, III, and IV, wherein recurring unit I is:

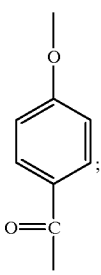

I recurring unit II is:

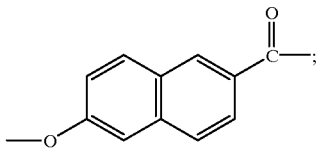

II recurring unit III is:

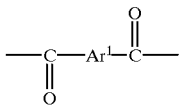

III wherein $Ar^1$ is selected from the group consisting of:

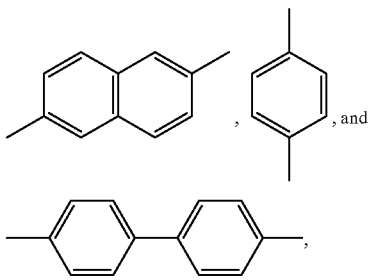

and mixtures thereof;
and recurring unit IV is:

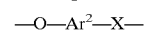

IV wherein $Ar^2$ is selected from the group consisting of:

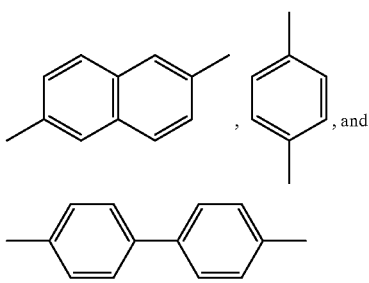

and mixtures thereof, and X is independently selected from the group consisting of O and $NR^2$ wherein $R^2$ is independently selected from the group consisting of hydrogen and $C_1$ to $C_6$ alkyl;

to provide a polymer that consists essentially of from about 15 to about 60 mole percent of recurring unit I, from about 15 to about 60 mole percent of recurring unit II, from about 5 to about 20 mole percent of recurring unit III, from about 5 to about 20 mole percent of recurring unit IV, and from about 7 to about 15 mole percent of recurring unit V, wherein:

(a) recurring units I and II combined are present in the polymer in an amount of from about 50 to about 75 mole percent, (b) the polymer contains at least about 5 mole percent of recurring units of the formula:

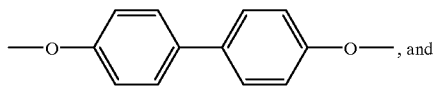, and (c) at least a portion of recurring unit III is:

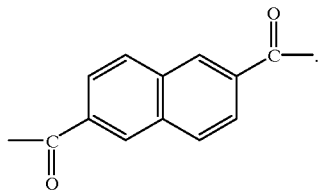

In a further embodiments this invention is directed to anisotropic melt-forming polymers produced in accordance with the process described in the immediately preceding paragraph as well as to stretched articles formed from such polymers.

DETAILED DESCRIPTION OF THE INVENTION

The process of this invention produces highly stretchable amorphous polymers. The polymers are considered to be amorphous in that they lack a well defined melting point or $T_m$ (i.e., a solid to nematic endothermic peak as measured by differential scanning calorimetry). Despite the absence of a classic melting point, the subject polymers possess a solid to nematic fluid transition temperature that defines their melt processability. Polymers produced in accordance with this invention are melt processable at temperatures below about 270° C. Additionally, such polymers have $T_g$ values of about 150° C. or less. Preferably, the polymers have $T_g$ values of about 130° C. or less, most preferably about 120° C. or less. For co-extrusion applications with polyolefins, polymers that are melt processable at temperatures at or below 220° C. are of particular interest.

As noted above, the thermal properties of liquid crystalline polymers vary with composition. While almost all liquid crystalline polymers are stretchable in the melt, relatively few are stretchable at temperatures below which they are molten. The extent to which a polymer can be stretched or drawn depends upon the temperature at which stretching occurs as well as the form and size of the material that is being stretched. LCPs of the subject invention exhibit a percentage of break strain at break point (herein also referred to as the polymer's degree of stretchability) of at least about 100% when spun into tapes that are tested in accordance with the procedure set forth in the Examples below.

Anisotropic melt-phase forming polymers formed by the present invention consist essentially of at least five different recurring units. Unit I of the subject polymers, termed a para-oxybenzoyl unit, possesses the structural formula:

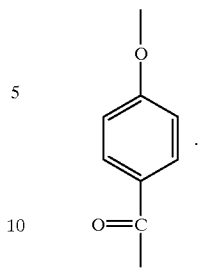

While not specifically illustrated in the structural formula, at least some of the hydrogen atoms present on the aromatic ring of unit I may be substituted. Included among the representative precursors from which recurring unit I may be derived are: 4-hydroxybenzoic acid; 3-chloro-4-hydroxybenzoic acid; 3-methyl-4-hydroxybenzoic acid; 3-methoxy-4-hydroxybenzoic acid 3-phenyl-4-hydroxybenzoic acid; 3,5-dichloro-4-hydroxybenzoic acid; 3,5-dimethyl-4-hydroxybenzoic acid; 3,5-dimethoxy-4-hydroxybenzoic acid; and the like. In a preferred embodiment, no ring substitution is present on recurring unit I. Recurring unit I is present in the polymers of the subject invention in an amount of from about 15 to about 60 mole percent, preferably from about 20 to about 40 mole percent.

Recurring unit II of the subject polymers, termed a 6-oxy-2-naphthoyl unit, possesses the structural formula:

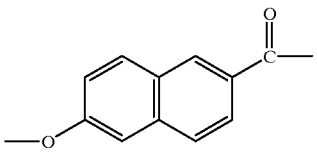

As in the case of recurring unit I, at least some of the hydrogen atoms present on the aromatic ring structure of recurring unit II may be substituted. Exemplary of such substituents are alkyl groups of 1 to 4 carbon atoms, alkoxy groups of 1 to 4 carbon atoms, phenyl, halogen (e.g., Cl, Br, and I), and mixtures thereof. Representative of the precursors from which recurring unit II may be derived are aromatic hydroxy-naphthoic acids which include: 6-hydroxy-2-naphthoic acid; 6-hydroxy-5-chloro-2-naphthoic acid; 6-hydroxy-5-methyl-2-naphthoic acid; 6-hydroxy-5-methoxy-2-naphthoic acid; 6-hydroxy-5-phenyl-2-naphthoic acid; 6-hydroxy-7-chloro-2-naphthoic acid; 6-hydroxy-5,7-dichloro-2-naphthoic acid, and the like. In a preferred embodiment no ring substitution is present on recurring unit II. Recurring unit II is present in the subject polymers in an amount of from about 15 to about 60 mole percent, preferably from about 20 to about 40 mole percent. Combined, recurring units I and II comprise from about 50 to about 75 mole percent, preferably from about 60 to about 70 mole percent of the subject polymers.

Recurring unit III of the subject polymers possesses the structural formula:

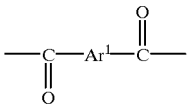

wherein $Ar^1$ is a divalent radical selected from the group consisting of:

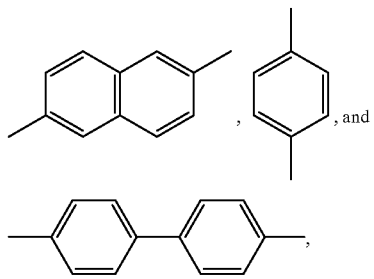, 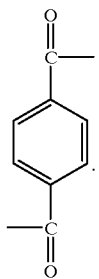, and mixtures thereof, wherein at least a portion of recurring unit III is (IIIa)

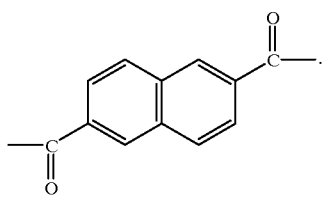

The amount of recurring III that is made up of unit IIIa is variable. In one embodiment recurring unit III contains at least about 50 mole percent of unit IIIa; in other embodiments recurring unit III contains a minimum of 30 mole percent or less of unit IIIa. Although not specifically shown in the formulas given, the aromatic ring structure of recurring unit III may be substituted in a manner similar to that described for recurring unit I. Preferably no ring substitution is present on recurring unit III. Recurring unit III is derived, for example, from precursors such as 2,6-naphthalene dicarboxylic acid alone or in combination with terephthalic acid and/or 4,4'-biphenyldicarboxylic acid. Recurring unit III is present in the polymers of the subject invention in an amount of from about 5 to about 20 mole percent, preferably from about 10 to about 15 mole percent. In one embodiment of interest, recurring unit III consists of:

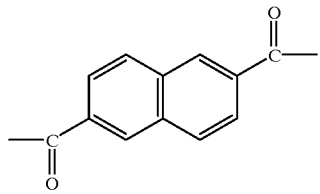

In another embodiment interest, recurring unit III consists of a mixture of units:

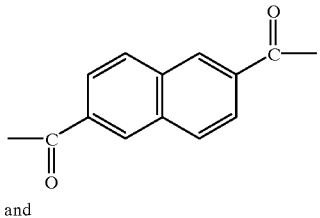

and

Recurring unit IV of the subject polymers, possesses the formula:

$$-O-Ar^2-X-$$

wherein $Ar^2$ and X are as previously defined. Although not specifically illustrated in the structural formula given, the aromatic ring structure of recurring unit IV may be substituted in a manner similar to that described for recurring unit I. Representative of the precursors from which recurring unit IV may be derived are aromatic diols such as, for example, 4,4'-biphenol, hydroquinone, 2,6-naphthalene diol, p-aminophenol, and the like. Preferably, no ring substitution is present on recurring unit IV. Recurring unit IV is present in the polymers of the subject invention in an amount of from about 5 to about 20 mole percent, preferably from about 10 to about 15 mole percent. In the practice of this invention, the subject polymers contain at least about 5 mole percent of recurring units of the formula:

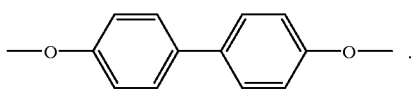

In one embodiment of particular interest recurring unit IV consists of units of the formula:

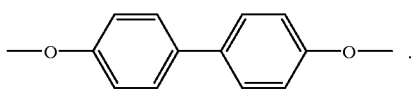

In another embodiment of interest, recurring unit IV consists of a mixture of the following units:

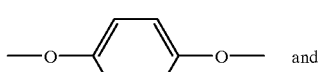 and

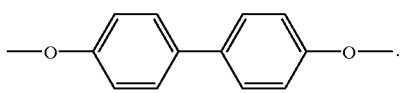

Recurring unit V of the subject polymers has the formula:

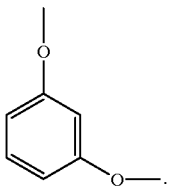

Although not specifically illustrated in the structural formula given, the aromatic ring structure of recurring unit V may be substituted in a manner similar to that described for recurring unit I. Preferably, no ring substitution is present on recurring unit V. In the practice of this invention, recurring unit V is present in the subject polymer in an amount of from about 7 to about 15 mole percent, preferably from about 10 to about 15 mole percent. Resorcinol is a preferred precursor from which recurring unit V is derived.

Minor amounts of other units that provide ester or ester-amide linkages may be present, provided, that such units do not obviate the properties desired by this invention. It will be apparent to those skilled in the art that the total amount of dioxy and oxy-amino units present in the subject polymers will be substantially equal to the total amount of dicarboxy units. In general, the various recurring units will be present in the resultant polymers in a random configuration. Preferably the polymers are wholly aromatic materials.

The polymers formed by the process of this invention commonly exhibit a weight average molecular weight of from about 10,000 to about 80,000. The molecular weight of preference will depend, in part, on the intended end-use application. For example, in fiber and film applications, weight average molecular weights of from about 20,000 to about 40,000 are commonly of interest. The polymers typically exhibit an inherent viscosity (I.V.), measured at 25° C. as a 0.1% by weight solution of polymer in a mixture of equal volumes of pentafluorophenol and hexafluorisopropanol, of at least about 1.0 dl/g, with polymers having inherent viscosities of from about 3.0 dl/g to about 7.0 dl/g being of particular interest.

Characteristic of the subject polymers is the formation of an anisotropic melt phase. Thus, in the melt there is a tendency for the polymer chains to orient in the shear direction. Such thermotropic properties are manifest at a temperature which is amenable for melt processing to form shaped articles. Anisotropy in the melt may be confirmed by conventional polarized light microscopy techniques.

The polymers of this invention are typically prepared by a polymerization reaction that proceeds through the acetate form of the hydroxycarboxylic acid, diol and, when present, hydroxyamine reactants. Thus, it is possible to employ as starting materials reactants having pre-acetylated hydroxyl groups and amino groups, heat the reaction mix to polycondensation temperature and maintain reaction until a desired polymer viscosity is reached. Alternatively, it is possible to acetylate in situ, in which case the aromatic hydroxycarboxylic acid, aromatic diol and, when present, hydroxyamine are reacted with acetic anhydride, acetic acid by-product is removed, the esterified reactants together with the aromatic diacid are heated to polycondensation temperature, and reaction is maintained until a desired polymer viscosity is reached. The aromatic diacid reactant may, but need not, be present during the acetylation reaction. If the acetylation and polycondensation reactions are conducted in a single reactor, it is common to charge the reactor with the reactant materials in a single step.

Using separate acetylation and polymerization reactors, it may be desirable to introduce the diacid component to the polymerization reactor as opposed to the acetylation reactor. The acetylation and polycondensation reactions are typically conducted in the presence of suitable catalysts. Such catalysts are well known in the art and include, for example, alkali and alkaline earth metal salts of carboxylic acids, such as, for example, potassium acetate, sodium acetate, magnesium acetate, and the like. Such catalysts are typically used in amounts of from about 50 to about about 500 parts per million based on the total weight of the recurring unit precursors.

Acetylation is generally initiated at temperatures of about 90° C. In the initial stage of the acetylation reflux is desirably employed to maintain vapor phase temperature below the point at which acetic acid byproduct and anhydride begin to distill. Temperatures during the initial stage of acetylation typically range from between 90° to 150° C., preferably about 100° to about 130° C. In order to complete the acetylation, the reaction mixture is then heated to final melt temperature of about 150° to about 220° C., preferably about 150° to about 200° C., with temperatures of 180° to 200° C. being of particular interest. At this point, if reflux is used, the vapor phase temperature should exceed the boiling point of acetic acid but remain low enough to retain residual acetic anhydride.

To ensure substantially complete reaction, it may be desirable to utilize an excess amount of acetic anhydride in conducting the acetylation. The amount of excess anhydride utilized will vary depending upon the particular acetylation conditions employed, including the presence or absence of reflux. The use of an excess of from about 1 to about 10 mole percent of acetic anhydride, based on the total moles of reactant hydroxyl groups present is not uncommon.

To obtain both complete acetylation and maintenance of stoichiometric balance, anhydride loss should be minimized. Acetic acid vaporizes at temperatures of about 118° C. At higher temperatures, i.e., about 140° C. acetic anhydride also begins to vaporize. Providing the reactor with a means of controlling vapor phase reflux is desirable. Maintaining vapor phase reflux temperature at about 120° to about 130° C. is particularly desirable.

Polycondensation of the acetylated starting materials generally begins to take place at a temperature within a range of from about 210° to about 260° C. As acetic acid is also a byproduct of the polymerization reaction, it is desirable to employ controlled vapor phase reflux when conducting the polycondensation reaction. In the absence of controlled vapor phase reflux, acetic anhydride, acetoxybenzoic acid and other volatile materials are vaporized as the polymerization temperature is increased. Depending on the particular polymer synthesized, it is preferable to maintain vapor phase reflux temperatures of about 120° to about 130° C. during the polymerization reaction.

As the final polymerization temperature is approached, volatile byproducts of the reaction having boiling points above that of acetic acid and acetic anhydride should be removed. Accordingly at reactor temperatures of about 250° to about 300° C., vapor phase reflux, if used, is generally adjusted to allow higher vapor phase temperatures or is discontinued. The polymerization is generally allowed to proceed until a desired polymer viscosity is reached. To build molecular weight in the melt, the polymerization reaction is generally conducted under vacuum, the application of which facilitates the removal of volatiles formed during the final stage of the polycondensation.

Following polymerization, the molten polymer is discharged from the reactor, typically through an extrusion orifice fitted with a die of desired configuration; cooled; and collected. Commonly, the melt is discharged through a perforated die to form strands which are taken up in a water bath, pelletized and dried.

In an embodiment of particular interest this invention is directed to highly stretchable, amorphous anisotropic melt-forming polymers consisting essentially of recurring units I, II, III, IV and V, wherein recurring unit I is

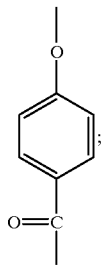

recurring unit II is:

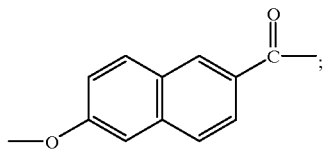

recurring unit III is:

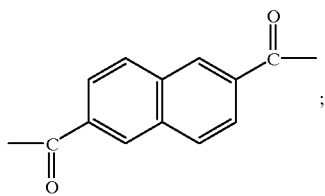

recurring unit IV is:

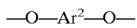

wherein $Ar^2$ is selected from the group consisting of:

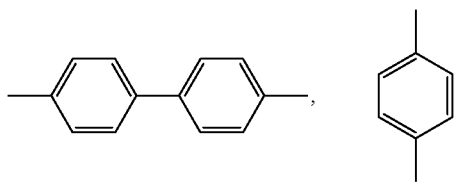

and mixtures thereof; and recurring unit V is:

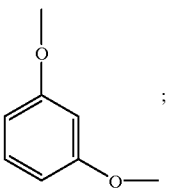

wherein said polymer contains from about 20 to about 40 mole percent of recurring unit I, from about 20 to about 40 mole percent of recurring unit II, from about 10 to about 15 mole percent of recurring unit III, from about 10 to about 15 mole percent of recurring unit IV, and from about 10 to about 15 mole percent of recurring unit V and wherein:

(a) recurring units I and II combined are present in the polymer in an amount of from about 60 to about 70 mole percent and (b) the polymer contains at least about 5 mole percent of recurring units of the formula:

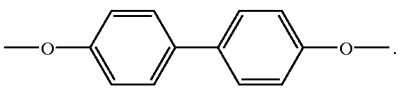

In another embodiment of particular interest this invention is directed to highly stretchable, amorphous anisotropic melt-forming polymers consisting essentially of recurring units I, II, III, IV and V, wherein recurring unit I is

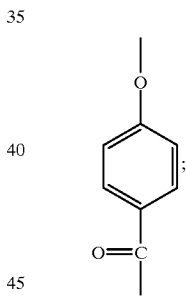

recurring unit II is:

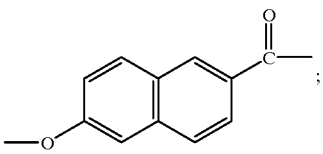

recurring unit III consists of a mixture of:

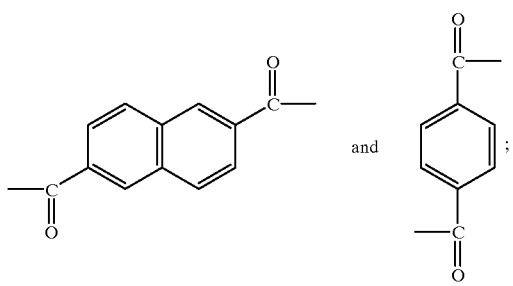

recurring unit IV is:

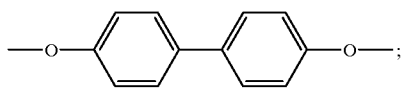

and recurring unit V is:

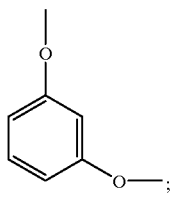

wherein said polymer contains from about 30 to about 35 mole percent of recurring unit I, from about 30 to about 35 mole percent of recurring unit II, from about 10 to about 15 mole percent of recurring unit III, from about 10 to about 15 mole percent of recurring unit IV, and from about 10 to about 15 mole percent of recurring unit V.

Although the polymers produced by the process of this invention are particularly well suited for extrusion and co-extrusion applications such as the production of fiber, film, sheet, blow molded articles and the like, they may also be used in the production of injection molded parts. If desired, compositions containing the subject polymers may contain one or more additional optional components such as for example, colorants, lubricants, processing aids, stabilizers, fillers, reinforcing agents, and the like. Fillers and reinforcing agents are not typically present in compositions used in fiber and film applications.

EXAMPLES

The following examples are presented to further illustrate this invention. The examples are not, however, intended to limit the invention in any way.

Example 1 and Comparative Examples $C_1$ and $C_2$

To a 3-necked cylindrically shaped flask equipped with a stainless steel "C"-shaped agitator, gas inlet tube, thermocouple, distilling trap and Vigreux column attached to a condenser and receiver were added:

331.2 grams p-hydroxybenzoic acid
225.6 grams 6-hydroxy-2-naphthoic acid
99.6 grams of terephthalic acid
111.6 grams of 4,4'-biphenol
129.6 grams of 2,6-naphthalene dicarboxylic acid
66.0 grams of resorcinol
632.9 grams of acetic anhydride
0.12 grams of potassium acetate (60 ppm)

The flask was purged of oxygen by evacuation and flushing with dried nitrogen and immersed into an electrically heated fluidized sand bath. The contents of the flask were heated to ~150° C. while stirring at 75 rpm to acetylate hydroxyl groups. Temperature was raised from 150° to 220° C. over a period of 70 minutes to distill by-product acetic acid. Polymerization commenced at 220° C. and batch temperature was raised to 340° C. over a period of 130 minutes. During this time acetic acid that evolved was removed by distillation. After a 30 minute hold time at 340° C., vacuum was applied and the pressure gradually reduced to ~5 mm Hg over a period of 20 minutes. The vacuum was maintained until the torque required to maintain agitator speed reached the target value necessary to give the desired melt viscosity. At the target torque the vacuum was discontinued and the flask brought to atmospheric pressure with dry nitrogen.

This process produced a polymer having an inherent viscosity (I.V.) of 3.0 dl/g, as measured at 25° C. as a 0.1% by weight solution of polymer in a mixture of equal volumes of pentafluorophenol and hexafluoroisopropanol. The melt viscosity (M.V.) of the polymer was ~1500 poise, at a shear rate of 1000 $sec^{-1}$, measured at 270° C. in a capillary rheometer using an orifice 1 mm in diameter and 20 mm long. DSC (20° C./min. heating rate) indicated that the polymer had a Tg of 110° C.

Additional polymers were made and tested following a similar procedure. Table 1 lists the various Examples and Comparative Examples together with the mole percentages of the reactant monomers employed. Abbreviations are as follows:

"p-HBA" means p-hydroxybenzoic acid;
"HNA" means 6-hydroxy-2-naphthoic acid;
"TA" means terephthalic acid;
"NDA" means 2,6-naphthalene dicarboxylic acid;
"BP" means 4,4'-biphenol; and
"R" means resorcinol.

All polymerizations were conducted in the presence of 60 ppm potassium acetate using sufficient acetic anhydride to completely acetylate the hydroxyl groups present.

Hot stage microscopy with polarized light confirmed that all of the polymers were optically anisotropic. The polymers contained molar quantities of recurring units that corresponded to the molar charge of the reactant monomers. I.V., M.V., and $T_g$ data for the polymers (measured as described above) are reported in Table 2. Excluding those polymers for which a $T_m$ is reported, the polymers were amorphous.

TABLE 1

| | REACTANT MONOMERS (Mole %) | | | | | |
|---|---|---|---|---|---|---|
| Example | p-HBA | HNA | TA | NDA | BP | R |
| 1 | 40 | 20 | 10 | 10 | 10 | 10 |
| $C_1$ | 30 | 30 | 20 | — | 20 | — |
| $C_2$ | 30 | 30 | 10 | 10 | 20 | — |

The polymers of Example 1 and Comparative Example $C_1$ were melt spun into tapes using a Micromelt™ apparatus. The apparatus was equipped with a 0.127 mm by 6.35 mm die. Melt temperatures varied between 270–280° C. depending upon the melt characteristics of the sample. Throughput rates were 0.45 cc/min; take-up roller speeds were 2 rpm;

pack pressures ranged from about 110 kg/cm² to about 290 kg/cm², depending upon the Tg (or $T_m$) of the polymer. The resulting tapes had an approximate thickness of 0.05 mm and a width of about 6 mm.

Five test specimens, each 12.7 cm in length were cut from each tape. The thickness of the specimens was measured to the nearest 0.0025 mm and the width to the nearest 0.25 mm. Each specimen was placed in a preheated Instron oven, allowed 6 minutes to come to temperature and then tested on a Instron type universal tester (equipped with a thermal chamber), set to a test temperature of 150° C. The gauge length was set at 25 mm and the crosshead speed was set at 50.8 mm/min. The % break strain was calculated at the break point. The % break strain is reported in Table 2 as the average of the data for the five specimens tested. Standard deviations are also provided.

TABLE 2

| | | | TESTING DATA | | |
| EXAMPLE | I.V. (dl/g) | M.V. (poise) | BREAK STRAIN, % Avg./Std. Dev. | TEST TEMP. (° C.) | Tg (° C.) |
|---|---|---|---|---|---|
| 1 | 3.0 | 1511 | 230/40 | 150 | 115 |
| C₁ | 9.5 | 2592 | 2.3/0.2 | 150 | $T_m$ of 250° C. |
| C₂ | — | 823 | — | — | $T_m$ of 222° C. |

What is claimed is:

1. A process for forming highly stretchable, amorphous anisotropic melt-forming polymers which comprises incorporating recurring unit V of the formula:

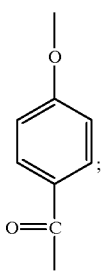

V into a polymer comprising recurring units I, II, III, and IV, wherein recurring unit I is:

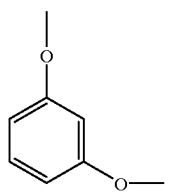

I recurring unit II is:

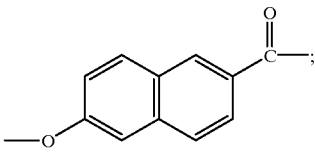

II recurring unit III is:

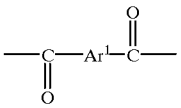

III wherein $Ar^1$ is selected from the group consisting of:

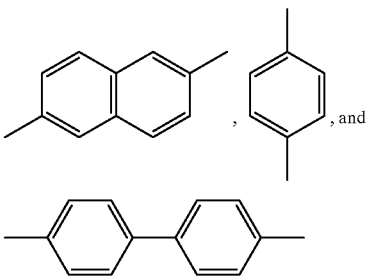

, and and mixtures thereof;
and recurring unit IV is:

—O—Ar²—X—

IV wherein $Ar^2$ is selected from the group consisting of:

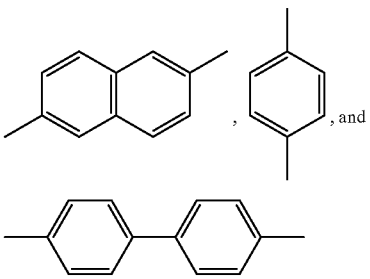

, and and mixtures thereof, and X is independently selected from the group consisting of O and $NR^2$ wherein $R^2$ is independently selected from the group consisting of hydrogen and $C_1$ to $C_6$ alkyl;
to provide a polymer that consists essentially of from about 15 to about 60 mole percent of recurring unit I, from about 15 to about 60 mole percent of recurring unit II, from about 5 to about 20 mole percent of recurring unit III, from about 5 to about 20 mole percent of recurring unit IV, and from about 7 to about 15 mole percent of recurring unit V wherein:
(a) recurring units I and II combined are present in the polymer in an amount of from about 50 to about 75 mole percent, and (b) the polymer contains at least about 5 mole percent of recurring units of the formula:

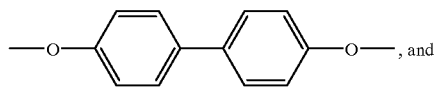

(c) at least a portion of recurring unit III is:

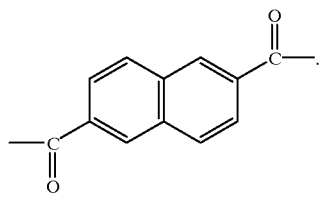

2. A process as described in claim 1 wherein recurring unit III is:

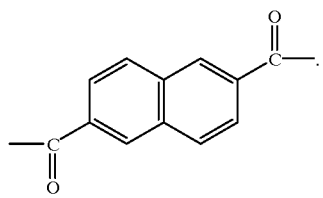

3. A process as described in claim 1 wherein recurring unit III consists of mixture of the following:

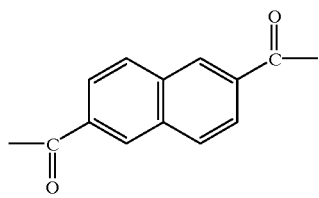

and

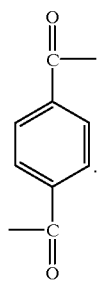

4. A process as described in claim 1 wherein recurring unit I is present in the polymer in an amount of from about 30 to about 35 mole percent, recurring unit II is present in the polymer in an amount of from about 30 to about 35 mole percent, recurring unit III is present in the polymer in an amount of from about 10 to about 15 mole percent, recurring unit IV is present in the polymer in an amount of from about 10 to about 15 mole percent, and recurring unit V is present in the polymer in an amount of from about 10 to about 15 mole percent.

5. A process as described in claim 2 wherein recurring unit I is present in the polymer in an amount of from about 30 to about 35 mole percent, recurring unit II is present in the polymer in an amount of from about 30 to about 35 mole percent, recurring unit III is present in the polymer in an amount of from about 10 to about 15 mole percent, recurring unit IV is present in the polymer in an amount of from about 10 to about 15 mole percent, and recurring unit V is present in the polymer in an amount of from about 10 to about 15 mole percent.

6. A process as described in claim 3 wherein recurring unit I is present in the polymer in an amount of from about 30 to about 35 mole percent, recurring unit II is present in the polymer in an amount of from about 30 to about 35 mole percent, recurring unit III is present in the polymer in an amount of from about 10 to about 15 mole percent, recurring unit IV is present in the polymer in an amount of from about 10 to about 15 mole percent, and recurring unit V is present in the polymer in an amount of from about 10 to about 15 mole percent.

7. A process as described in claim 5 wherein recurring unit IV is

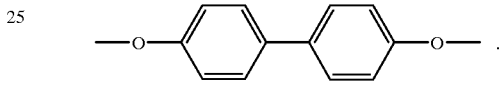

8. A process as described in claim 6 wherein recurring unit IV is

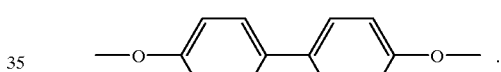

9. A highly stretchable, amorphous anisotropic melt-forming polymers consisting essentially of recurring units I, II, III, IV and V wherein recurring unit I is

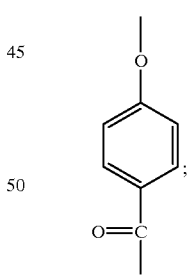

recurring unit II is:

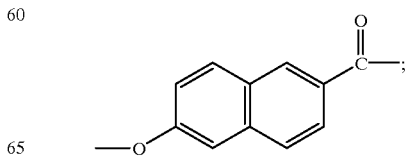

recurring unit III is:

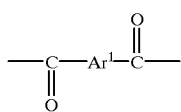
III wherein is Ar¹ is selected from the group consisting of:

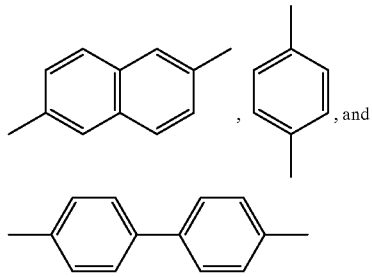

and mixtures thereof;
recurring unit IV is:

IV wherein Ar² is selected from the group consisting of:

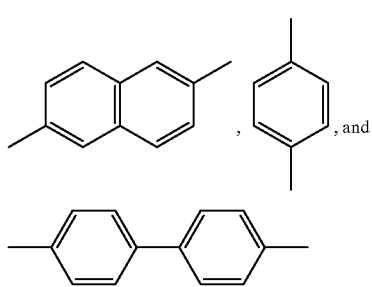

and mixtures thereof, and X is independently selected from the group consisting of O or $NR^2$ wherein $R^2$ is independently selected from the group consisting of hydrogen and a $C_1$ to $C_6$ alkyl; and
recurring unit V is:

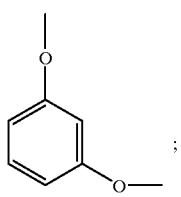
V wherein recurring unit I is present in the polymer in an amount of from about 15 to about 60 mole percent, recurring unit II is present in the polymer in an amount of from about 15 to about 60 mole percent, recurring unit III is present in the polymer in an amount of from about 5 to about 20 mole percent, recurring unit IV is present in the polymer in an amount of from about 5 to about 20 mole percent, and recurring unit V is present in the polymer in an amount of from about 7 to about 15 mole percent, wherein;

(a) recurring units I and II combined are present in the polymer in an amount of from about 50 to about 75 mole percent and
(b) the polymer contains at least about 5 mole percent of recurring units of the formula:

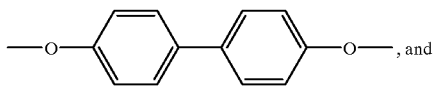, and (c) at least a portion of recurring unit III is:

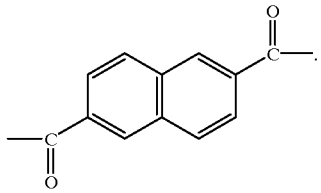

10. A polymer as described in claim 9 wherein recurring unit III is:

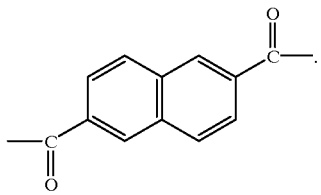

11. A polymer as described in claim 9 wherein recurring unit III consists of a mixture of:

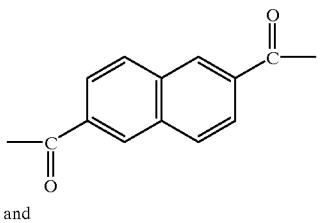

and

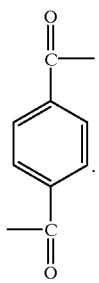

12. A polymer as described in claim 9 wherein recurring unit I is present in the polymer in an amount of from about 30 to about 35 mole percent, recurring unit II is present in the polymer in an amount of from about 30 to about 35 mole percent, recurring unit III is present in the polymer in an amount of from about 10 to about 15 mole percent, recurring unit IV is present in the polymer in an amount of from about 10 to about 15 mole percent, and recurring unit V is present in the polymer in an amount of from about 10 to about 15 mole percent.

13. A polymer as described in claim 10 wherein recurring unit I is present in the polymer in an amount of from about 30 to about 35 mole percent, recurring unit II is present in the polymer in an amount of from about 30 to about 35 mole percent, recurring unit III is present in the polymer in an amount of from about 10 to about 15 mole percent, recurring unit IV is present in the polymer in an amount of from about 10 to about 15 mole percent, and recurring unit V is present in the polymer in an amount of from about 10 to about 15 mole percent.

14. A polymer as described in claim 11 wherein recurring unit I is present in the polymer in an amount of from about 30 to about 35 mole percent, recurring unit II is present in the polymer in an amount of from about 30 to about 35 mole percent, recurring unit III is present in the polymer in an amount of from about 10 to about 15 mole percent, recurring unit IV is present in the polymer in an amount of from about 10 to about 15 mole percent, and recurring unit V is present in the polymer in an amount of from about 10 to about 15 mole percent.

15. A polymer as described in claim 13 wherein recurring unit IV is

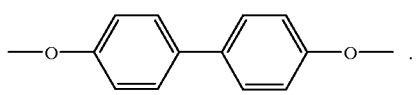

16. A polymer as described in claim 14 wherein recurring unit IV is

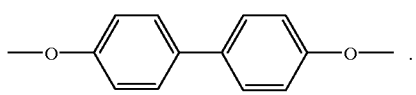

17. A highly stretchable, amorphous anisotropic melt-forming polymer that consists essentially of recurring units I, II, III, IV and V, wherein recurring unit I is

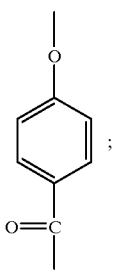

recurring unit II is:

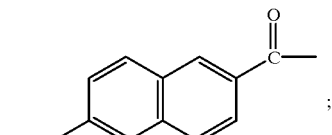

recurring unit III is:

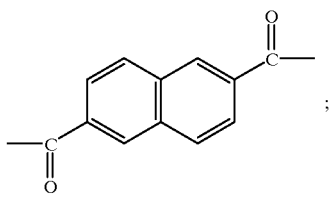

recurring unit IV is:

wherein $Ar^2$ is selected from the group consisting of:

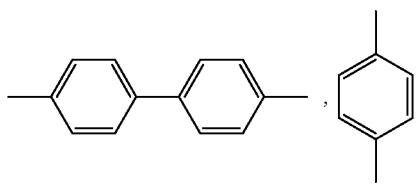

and mixtures thereof; and recurring unit V is:

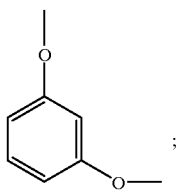

wherein said polymer contains from about 20 to about 40 mole percent of recurring unit I, from about 20 to about 40 mole percent of recurring unit II, from about 10 to about 15 mole percent of recurring unit III, from about 10 to about 15 mole percent of recurring unit IV, and from about 10 to about 15 mole percent of recurring unit V and wherein:

(a) recurring units I and II combined are present in the polymer in an amount of from about 60 to about 70 mole percent and (b) the polymer contains at least about 5 mole percent of recurring units of the formula:

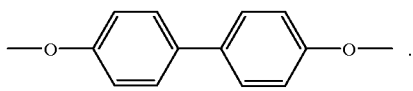

18. A highly stretchable, amorphous anisotropic melt-forming polymers consisting essentially of recurring units I, II, III, IV and V, wherein recurring unit I is

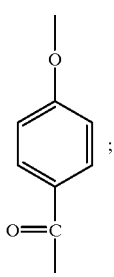

recurring unit II is:

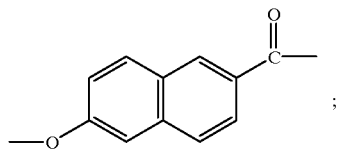

recurring unit III consists of a mixture of:

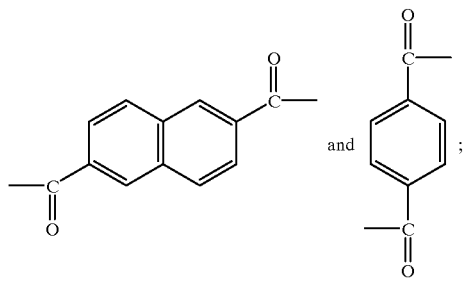

recurring unit IV is:

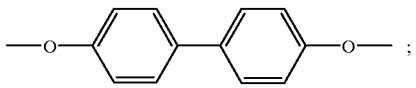

and recurring unit V is:

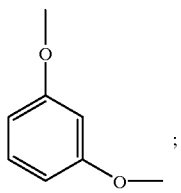

wherein said polymer contains from about 30 to about 35 mole percent of recurring unit I, from about 30 to about 35 mole percent of recurring unit II, from about 10 to about 15 mole percent of recurring unit III, from about 10 to about 15 mole percent of recurring unit IV, and from about 10 to about 15 mole percent of recurring unit V.

19. A shaped article produced from the polymer of claim 9.

20. A shaped article produced from the polymer of claim 17.

21. A shaped article produced from the polymer of claim 18.

22. A shaped article as described by claim 19 which is a multilayer structure in which said amorphous anisotropic melt-forming polymer is present as a barrier layer.

23. A shaped article as described by claim 20 which is a multilayer structure in which said amorphous anisotropic melt-forming polymer is present as a barrier layer.

24. A shaped article as described by claim 21 which is a multilayer structure in which said amorphous anisotropic melt-forming polymer is present as a barrier layer.

25. A film formed from the polymer of claim 9.
26. A film formed from the polymer of claim 17.
27. A film formed from the polymer of claim 18.

* * * * *